United States Patent [19]

Weber et al.

[11] 4,199,123
[45] Apr. 22, 1980

[54] TRIPOD LEVELING MECHANIZATION

[75] Inventors: Morris Weber, Sherman Oaks; Edgar M. Jaehnke, Los Angeles, both of Calif.

[73] Assignee: Hughes Aircraft Company, Culver City, Calif.

[21] Appl. No.: 934,104

[22] Filed: Aug. 16, 1978

[51] Int. Cl.² ........................................... F16M 11/38
[52] U.S. Cl. .............................. 248/168; 248/188.2; 248/434
[58] Field of Search ............... 248/169, 168, 170, 171, 248/434, 435, 166, 188.6, 188.2, 188.8, 188.9

[56] References Cited

U.S. PATENT DOCUMENTS

| 23,428 | 3/1859 | Lemis | 248/171 |
|---|---|---|---|
| 2,282,285 | 5/1942 | Olson | 248/169 |
| 2,341,542 | 2/1944 | Grime | 248/188.6 X |
| 2,371,460 | 3/1945 | Needham | 248/188.2 X |
| 3,213,963 | 10/1965 | Vogt | 248/188.9 X |
| 3,762,269 | 10/1973 | Rusbach | 248/170 X |
| 4,015,806 | 4/1977 | Cattermole | 248/188.2 X |
| 4,094,484 | 6/1978 | Galione | 248/171 X |
| 4,096,662 | 6/1978 | Anderson | 248/170 X |

FOREIGN PATENT DOCUMENTS 1010254  4/1952  Fed. Rep. of Germany ........ 248/188.8

Primary Examiner—J. Franklin Foss
Attorney, Agent, or Firm—Lewis B. Sternfels; W. H. MacAllister

[57] ABSTRACT

The tripod (10) comprises an equipment support (12), three legs (14, 16) pivotally secured to the support, a center post (22) extending from the support and between the legs, and three stabilizer links (28) secured respectively between the legs and the center post. Gross adjustment is first made for each leg by adjusting the position of the end of its stabilizer link with respect to the leg. Thereafter, fine adjustments are made by rotating a turnbuckle (44) in the stabilizer link which lengthens or shortens the link to change the geometry of the triangle formed by the leg, the center post, and the stabilizer link. A slider bearing (54) is attached between each of the legs and its respective foot pad (56). Since the foot pads have previously been firmly set into the ground, when the geometry change occurs, the slider bearing permits relative sliding between the leg and the foot pad without causing physical movement of the foot pad.

10 Claims, 6 Drawing Figures

4,199,123

TRIPOD LEVELING MECHANIZATION

BACKGROUND OF THE INVENTION

The invention herein described was made in the course of or under a contract or subcontract thereunder with the Department of the Army.

1. Field of the Invention

The present invention relates to fine leveling of a support mounted at least on one leg.

2. Description of the Prior Art

There are many mechanisms or applications which require leveling, such as transits, levels, telescopes, cameras, theodolites, and any pointing and tracking system requiring elevation and angulation operations.

One conventional system utilizes thumb screws opposed to each other to drive a two-axis gimbal or to rock a platform. Alternatively, one screw may be opposed by a spring to take up back-lash. Several problems are associated with such leveling arrangements.

Any off-center load weight over the screw increases the effort needed to turn the screw to effect the adjustment except, with respect to a turnable load, the load may be rotated so that its weight may be used to advantage. Also, the screw adjusting mechanism is located adjacent to the equipment to be levelled, in a crowded area where space limitations prevent the diameter of the screw to be enlarged; therefore, it becomes difficult for the operator to turn the screw. Additionally, such screw adjustments provide for a small mechanical advantage which, even for fine adjustments, require the exertion of large forces. Such exertion may be fatiguing to the operator and his thumb; furthermore, a large force over a small adjustment frequently results in an over-adjustment as the screw is suddenly moved past the point needed to effect the proper level. A further disadvantage is that a large number of intricate parts are used and these parts exist at critical points of the tripod, specifically, at the center of the tripod load attachment point. As a consequence, the platform is made less stiff and rigid and, therefore, less stable. The complexity of the leveling mechanisms not only increases the cost of manufacture but also increases the need to maintain or repair the equipment which, especially in the field, may not be possible. A further disadvantage is that the tripod, through use of a large number of intricate parts, becomes quite heavy and not easily transportable.

SUMMARY OF THE INVENTION

The present invention overcomes these and other problems by providing for a simple means and method by which equipment supports, such as tripods, may be levelled. After any gross adjustments have been made, fine adjustments are made by a means, e.g., a rotatable turnbuckle, which lengthens or shortens a stabilizer link connecting a leg and a center post extending from a support upon which the equipment is placed. Rotation of the turnbuckle changes the geometry of the triangle formed by the leg, the center post and the stabilizer link. A slideable connection between the end of the leg and the foot pad previously set into position permits the geometry change without physically moving the foot pad. Because the fine leveling adjustment is displaced from the equipment support, great mechanical advantage is provided.

It is, therefore, an object of the present invention to provide for ease of leveling adjustment in an equipment support regardless of the weight of the load and whether it is off-center from the support.

Another object is to provide for an adjustment which is displaced from otherwise crowded areas where the equipment is supported.

Another object is to provide for a large mechanical advantage which enables very fine adjustments to be made.

Another object is to reduce the number of parts required and to remove them from the critical load attachment points.

Another object is to provide for a stiffer and more rigid and, therefore, more stable platform.

Another object is to provide for a reduction of weight over prior mechanisms which is especially important when they must be carried by a person.

It is another object to provide for reduced expense not only in the cost of maintenance and repair but also in the initial cost of such equipment.

Other aims and objects as well as a more complete understanding of the present invention will appear from the following explanation of an exemplary embodiment and the accompanying drawings thereof.

DESCRIPTION OF THE PREFERRED EMBODIMENT

Figure 1:
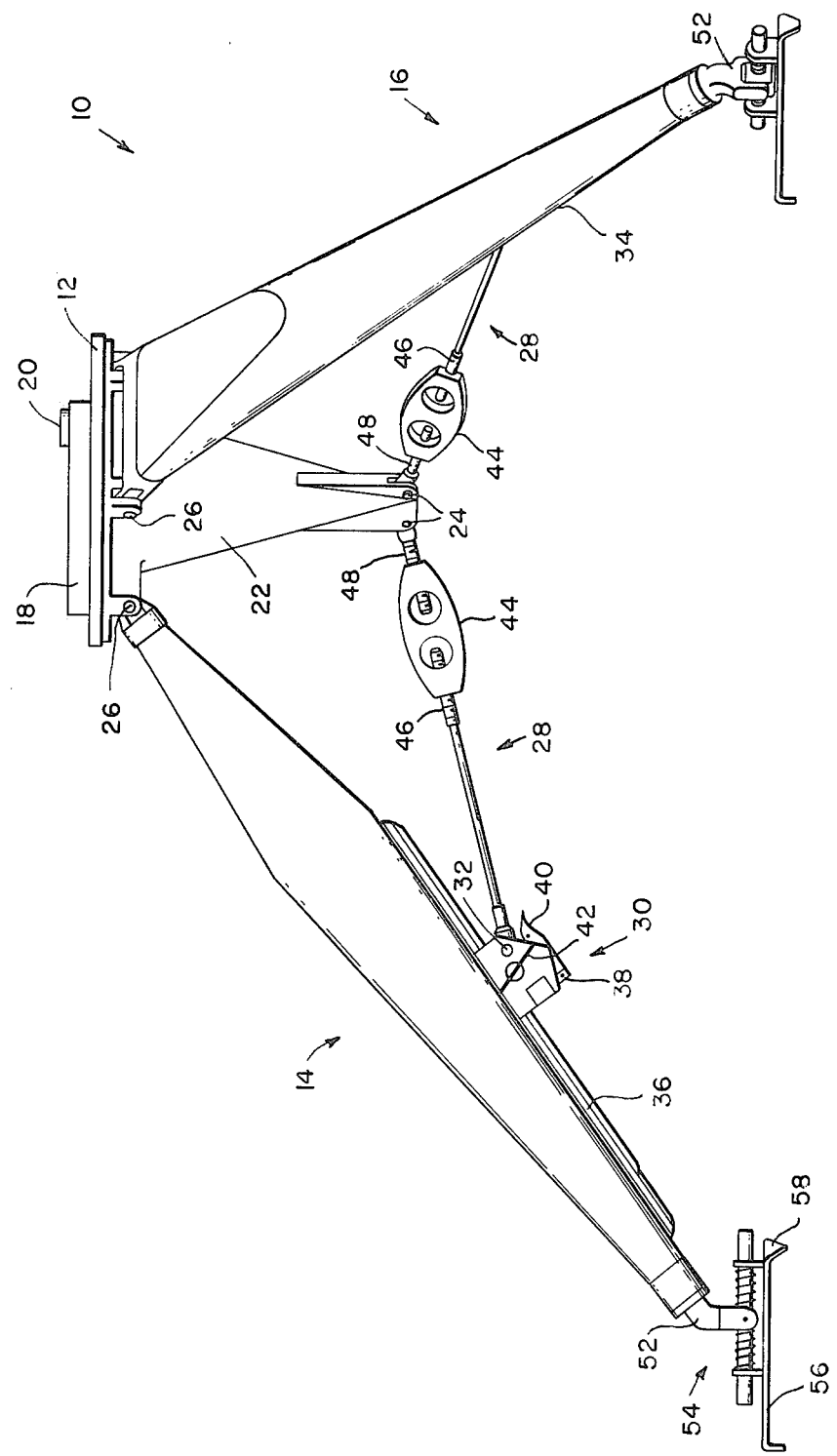
FIG. 1 is a view in elevation of the present invention embodied as a tripod, in which one of the legs is hidden behind another leg.

Accordingly, FIG. 1 depicts the invention embodied as a tripod 10 comprising a support or mount or platform 12 and three legs, two of which are identified by indicium 14 and 16. The third leg is directly behind leg 16 and, therefore, is not in view. Support 12 is disposed to receive the desired equipment, generally designated by indicium 18 having a bubble level 20 thereon. Bubble level 20 may comprise a circular bubble or crossing bubble vials although any instrumentation which will indicate the degree of leveling of support 12 or instrument 18 or both may be employed.

Extending downwardly from support 12 is a center post 22 formed integrally therewith. Separated pivots 24 are formed at the lower extremities of center post 22 while separated pivots 26 are positioned on support 12 directly. Each leg is pivotally mounted to support 12 on pivots 26 and is further coupled to center post 22 by struts or links 28, there being one link 28 for each leg and pivot 24. Each link is pivotally secured to a clamp assembly 30 at pivot 32. Clamp assembly 30 is designed to traverse one side 34 of leg 14, for example in a rail 36. The center adjustment for normally level installations utilizes a detent which is operated by a plunger 38 cooperating with a notch within rail 36. A lift 40 is used to raise detent plunger 38 from its notch if the ground is not level. A thumb screw clamp 42 also locks clamp assembly 30 to rail 36, especially when detent plunger 38 does not engage its notch. Because clamp assembly 30 is already known in the art, it will not be further referred to.

Figure 2:
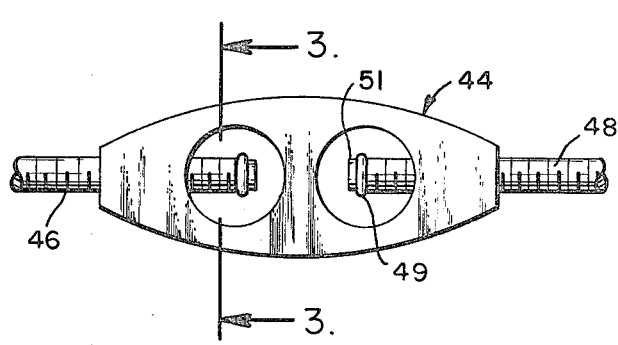
FIG. 2 is an enlarged view of the fine adjustment mechanism embodied as a turnbuckle.
Figure 3:
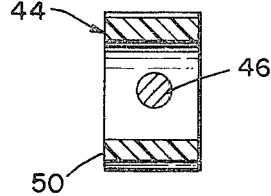
FIG. 3 is a cross-sectional view of the turnbuckle depicted in FIG. 2 taken along lines 3—3 thereof.

The length of each link 28 may be adjusted by means of a turnbuckle 44 which is shown in greater detail in FIGS. 2 and 3. Turnbuckle 44 is threadedly engaged to segments 46 and 48, all being of conventional design. A retaining ring 49 rides in a slot 51 in the end of one or both segments 46 and 48 to prevent inadvertent disengagement between the segments and the turnbuckle. Turnbuckle 44 may be made from any suitable material, such as a plastic, e.g., molybdenum disulfide-filled nylon.

Figure 5:
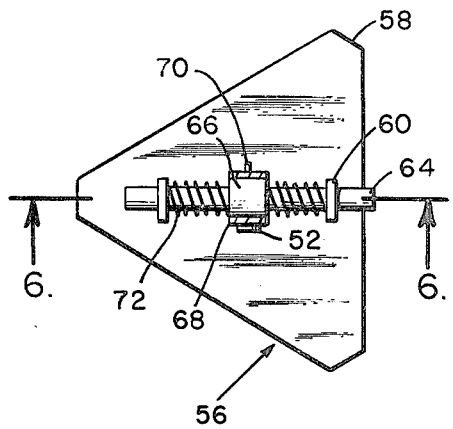
FIG. 5 is another view of the slideable connection illustrated in FIG. 4.
Figure 6:
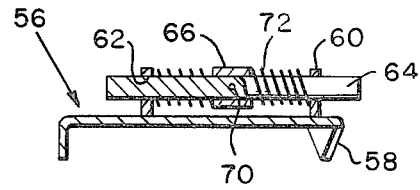
FIG. 6 is a view of the slideable connection taken along line 6—6 of FIG. 5.
Figure 4:
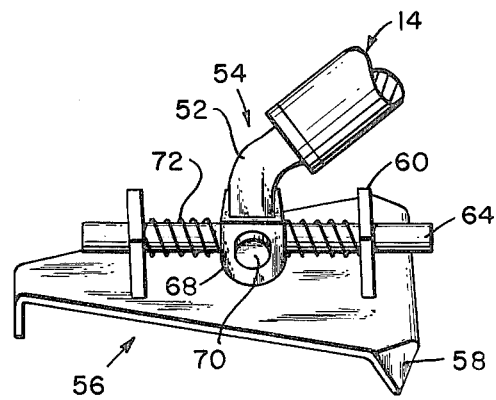
FIG. 4 is a prespective view of a slideable connection between a foot pad and a support leg.

As shown in FIGS. 1 and 4 and in greater detail in FIGS. 5 and 6, each of the legs is terminated by a clevis 52 having a loose connection 54 to a foot pad 56. Preferably, connection 54 is so structured as to permit complex movement of the foot pad with respect to the leg. The complex movement includes translation and pivoting of foot pad 56 along and about a translation-pivot axis which lies in the plane of the leg and link 28. The complex movement also includes pivotal movement of foot pad 56 about a pivot axis which is orthogonal to the translation-pivot axis. For applications other than the preferred embodiment of the present invention, other movements may be utilized.

Each foot pad has three prongs 58 which are intended to grip or penetrate the ground or other flooring upon which the tripod is to be set. Each foot pad 56 is also provided with a pair of upstanding lugs 60 having holes 62 therein for reception of a shaft 64 which slides within holes 62 about that axis referred to above as the translation-pivot axis. Positioned at the center of shaft 64 is a spacer 66. A pair of arms 68 of of clevis 52 extend on either side of spacer 66. A pin 70 extends through arm 68 of clevis 52, spacer 66 and shaft 64 to affix the three together but to permit pivotal movement of clevis 52 with respect to shaft 64 and spacer 66 and to define that axis referred to above as the pivot axis orthogonal to the translation-pivot axis. Positioned between spacer 66 and each of lugs 60 are springs 72. Therefore, the connection generally denoted by indicum 54 permits a predetermined movement of the end of legs 14 and 16 and the remaining hidden leg with respect to their foot pads 66.

In operation, if the ground is not level, detent plunger 38 and screw clamp 42 in one or more legs is released to provide for a gross leveling of support 12 and equipment 18. After gross leveling, screw clamp 42 is tightened. For fine leveling, the appropriate turnbuckle or turnbuckles 44 are turned to lengthen or shorten one or more links 28 as appropriate, until level indicator 20, e.g. a circular bubble, indicates that proper leveling has been accomplished. While each turnbuckle 44 is adjusted, clevis 52 and its attachments including sliding bar 64 slide with respect to foot pad 56 which has already been firmly place in the ground. The linear motion slide bearing 54 on each foot pad permits the leg end to move without requiring the foot pad to be moved or to move. However, if the turnbuckle or clamp assembly should result in a sufficiently large leg movement, the leg and the foot pad may be raised so that springs 72 recenter clevis 52 with respect to lugs 60 and foot pads 56, which thereby permits additional adjustment to be made after the foot pad has been firmly replaced in the ground.

Although the invention has been described with reference to a particular embodiment thereof, it should be realized that various changes and modifications may be made therein without departing from the spirit and scope of the invention.

What is claimed is:

1. A leveling mechanism comprising:
   a mount having separated pivots;
   at least one leg secured to a first of said pivots and extending from said mount and moveable in a plane passing through said first pivot;
   a stationary foot pad positioned on a ground support;
   a link coupled between said leg and a second of said pivots on said mount;
   means coupled to said link for changing the length of said link and thereby for adjusting the level of said mount; and
   means slidably coupling said foot pad to said leg for permitting relative linear movement between said leg and said foot pad and within the plane without movement of said foot pad from its ground support when the length of said link is changed.

2. A leveling mechanism according to claim 1 wherein said separated pivots comprise a first pair of pivots, and further including:
   a center post extending from said mount generally in the same direction as said leg;
   second and third pairs of separated pivots in which a first pivot of each of said three pairs is positioned directly on said mount and a second pivot of each of said three pairs is positioned on said center post;
   two further legs respectively coupled to said second and third pairs of separated pivots;
   two further links with length changing means coupled thereto and respectively secured between said two further legs and said center post second pivots; and
   two further foot pads respectively having loose connections with said two further legs.

3. A leveling mechanism comprising:
   a mount having separated pivots;
   at least one leg secured to a first of said pivots and extending from said mount;
   a stationary foot pad positioned on a ground support;
   a link coupled between said leg and a second of said pivots on said mount;
   means coupled to said link for changing the length of said link and thereby for adjusting the level of said mount; and
   means, including a loose connection, coupling said foot pad to said leg and comprising at least one member pivotally secured to said leg and slideably connected to said foot pad for providing two degrees of rotation and one degree of translation therebetween, thereby permitting relative movement between said leg and said foot pad without movement thereof from its ground support when the length of said link is changed.

4. A leveling mechanism comprising:
   a mount having separated pivots;
   a least one leg secured to a first of said pivots and extending from said mount;
   a stationary foot pad positioned on a ground support;
   a link coupled between said leg and a second of said pivots on said mount;
   means coupled to said link for changing the length of said link and thereby for adjusting the level of said mount; and
   means, including a loose connection, coupling said foot pad to said leg and comprising a shaft slideably held within supports on said foot pad, a spacer having a pivotal connection to said leg and a fixed connection to said shaft, and resilient means positioned between said spacer and said foot pad supports for normally centering said foot pad with respect to said leg, said shaft and said spacer in combination with said foot pad supports providing first degrees of rotation and translation between said foot pad and said leg, and said spacer to leg pivotal connection providing a second degree of rotation between said foot pad and said leg, thereby enabling relative movement between said leg and said foot pad without movement thereof from its ground support when the length of said link is changed.

5. A leveling mechanism according to claim 1, 2 or 3 further including biasing means between said foot pad and said leg for normally positioning said foot pad generally at a midpoint position of its movement with respect to said leg.

6. A leveling mechanism according to claim 4 wherein said coupling means including said loose connection further includes a clevis terminating said leg, and a pin extending through said clevis, said spacer and said shaft for providing the pivotal and fixed connections.

7. A leveling mechanism according to claim 6 wherein said foot pad has means for securing it to its ground support said loose connection permitting said foot pad to remain in its position on the ground support during change of the length of said link.

8. A leveling mechanism according to claim 7 wherein said link length changing means comprises a turnbuckle.

9. In a triangular structure having three corners positioned in a common plane in which a first corner is secured to a fixed support, a method for adjusting the position of a second corner of the triangular structure comprising the steps of adjusting the length between a third of the corners and the first corner and moving the first corner with respect to the fixed support along a line which lies within the plane.

10. A method according to claim 9 further comprising the step of biasing the first corner to a midpoint positon with respect to the fixed support.

* * * * *